United States Patent Office 2,796,765
Patented June 25, 1957

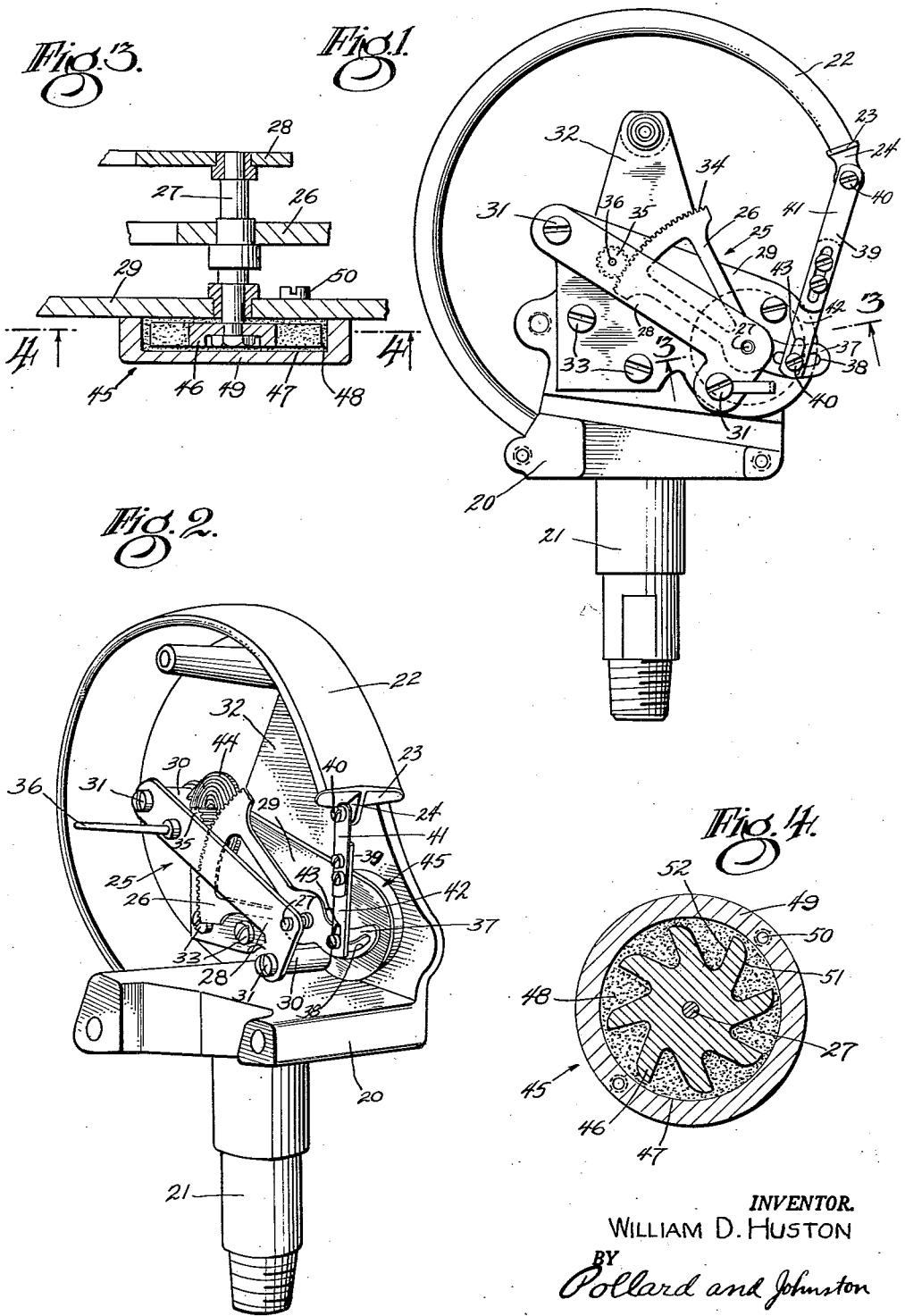

2,796,765

DAMPED PRESSURE GAGE

William D. Huston, Atlantic Highlands, N. J., assignor to American Machine and Metals, Inc., New York, N. Y., a corporation of Delaware Application December 2, 1952, Serial No. 323,661

6 Claims. (Cl. 73—414)

This invention relates to new and improved condition responsive means such as indicators for measuring pressures and forces or for condition responsive control systems, especially those which are subject to rapid or extreme fluctuation; and it particularly concerns damping means for indicators.

Conventional gauges or condition responsive means have force or pressure responsive elements, such as Bourdon tubes, diaphragms and bellows, which are deflected by the force, pressure, or condition being measured. A gauge movement impresses the extent of this deflection upon an indicator element which registers the value of the force, pressure, or condition. For accurate measurement, the responsive element must not only be sensitive to very small changes in value of the forces or pressures measured, but the deflection of the Bourdon tube, diaphragm or bellows in response to such changes must be sufficiently minute that the indicator will register the precise change in value. Accordingly, when the force or pressure to be measured is subject to rapid or violent pulsations, it is very difficult to measure accurately the average, mean or peak value of the source because the pulsations will be impressed on the sensitive force or pressure responsive element and will cause the gauge movement and indicator to vibrate or fluctuate. Such vibration makes reading of the gauge difficult. Also, it may cause misalignment of parts, thereby necessitating frequent readjustment. Further, it results in excessive strain and wear on the gauge elements, thereby reducing the expectant life of the gauge.

It has been the practice in the gauge and control art to damp out such undesirable pulsations at the source, for example, in pressure responsive devices, the flow of fluid into the sensitive element has been damped by providing fine capillaries, porous plugs and the like, which resist or delay the flow of fluid into the element. This has been done because the forces available within the gauge itself are not sufficient for applying the usual damping devices, such as dash pots and shock absorbers. Damping of the fluid flowing into the gauge, however, has several undesirable limitations. Because the deflection of the impulse responsive element is small in accurate gauges, it means that change in volume is small and correspondingly, the flow of fluid into this element is small. Thus, flow damping devices also must be extremely fine so as to provide a high resistance to the flow. Such resistance has to be limited because the small passages of such devices are easily clogged, and if the resistance is very high, the flow becomes sluggish and uncertain. Thus, while this type of damping is fairly satisfactory for low and medium rates and amplitudes of pulsations, it is not satisfactory for rapid or extreme pulsations.

An object of this invention is to provide improved movements for indicators and condition responsive means by which forces and pressures, especially those subject to rapid and extreme pulsations, may be measured, of force produced read, quickly and accurately.

Another object of this invention is to provide improved damped movements which allow slow, steady movements of the indicator pointer but which checks rapid or extreme fluctuation or vibration of the pointers.

Still another object of this invention is to provide improved movements for indicators embodying damping arrangements which are small in size, simple in construction, and efficient over a wide range of temperatures.

To attain the above-mentioned and other desirable objects, gauge or condition responsive apparatus is provided whereby the pulsations of the source being measured are damped in the gauge after the pressure or force responsive element of the apparatus and independently of the source so that all changes in the value of such source will be impressed on the responsive element, and yet only the average, mean or peak value, as desired, will be registered by the indicator.

The apparatus generally includes a measuring element, such as a Bourdon tube, upon which is impressed pressure or the condition to be measured, an indicator responsive element for registering the value of the pressure, and a damped gauge movement for transmitting the mean, peak or average value of impulses received by the measuring element to the indicator element. In order to damp the gauge movement independently of the source, the connection between the measuring element and the movement is a one-way connection which permits the measuring element to actuate the movement in one direction of its motion, and yet permits partial return of the measuring element in the opposite direction of its motion without actuation of the movement so that damping of the gauge movement will not check the vibrations or fluctuating motion of the measuring element. In one form, the damping element itself preferably is a rotor connected with the gauge movement and immersed in a highly viscous damping substance which flows freely under light, steady stresses but which acts as a rigid, slightly elastic substance under stresses of certain predetermined intensities. Thus, even though the forces available within the gauge are very small, this viscous fluid permits the damping rotor to be driven in one direction by forces applied to the gauge movement by the measuring element and returned by a light hairspring. Moreover, if the impulses received by the gauge movement become rapid or extreme due to pulsation of the source, the substance resists and damps such pulsation, thereby permitting the indicator to register accurately the average, mean or peak values of the source being measured.

Gauge or similar movements may include a rotatable gear segment which is actuated by the gauge measuring element and which in turn actuates a pinion carried by the indicator drive shaft. In a preferred embodiment of this invention, the gauge movement is damped ahead of the indicator element and the gear segment. By damping the motion of the arbor carrying the gear segment, the damping is effected on that part of the gear movement whose motion is extremely small. The friction resulting from the action of the damper is therefore minimized and the wear on the parts of the gear movement is lessened. Furthermore, because the motion at this point is so small, a very viscous substance, such as one having the properties described above, can be effectively employed.

These and other objects, advantages and features of this invention will become apparent from the following description of the drawings which are merely exemplary.

In the drawings:

Fig. 1 is a front elevation of a preferred embodiment of the invention with the outer casing removed to show internal elements more clearly;

Fig. 2 is a perspective view of the embodiment shown in Fig. 1;

Fig. 3 is a section taken along the line 3—3 of Fig. 1; and

Fig. 4 is a cross section of the damping member taken along line 4—4 of Fig. 3.

The drawings show the invention as applied to a pressure gauge of the Bourdon tube type, but it is to be understood that the invention is applicable to other equivalent gauges and indicators.

Referring now to all the figures, a socket member 20, which is mounted in a base of a gauge casing (not shown), has a stem 21 connectable into a pressure line of the source to be measured. A Bourdon tube 22 is connected to the socket 20 and is in open communication with the pressure source through stem 21 for admitting pressure fluid when the stem is inserted in a pressure line. The free end of the tube is sealed by a cap 23 which is provided with a centrally disposed lug 24 for connection with a gauge movement 25 in a manner presently to be described.

The gauge movement 25 comprises a gear segment 26 carried by an arbor 27 which is rotatably supported at opposite ends in plates 28 and 29. The plates are assembled in spaced relation by spacers 30 and screws 31, and this assembly is fixed to an upright extension 32 of the socket 20 by a pair of screws 33. The segment 26 has peripheral teeth 34 which mesh with a pinion 35 carried on a pointer spindle 36. The spindle extends between and is journaled in bearing surfaces in plates 28 and 29 in parallel spaced relation to the arbor 27. The forward portion of the spindle extends through the front plate 28 and is adapted to receive an indicator pointer (not shown) on its forward end.

The gear segment has a rearwardly extending tail 37 on the side of the arbor 27 opposite said gear teeth, which is slotted at 38 and is coupled to the free end of the Bourdon tube by a link 39 pivotally connected at opposite ends to lug 24 and tail 37 by machine screws 40 and nuts (not shown). The link is made up of two overlapping components 41 and 42 which are slotted at their overlapping ends and are joined together by dual screws and nuts. The length of the link can be varied by loosening the nuts and moving the components relative to one another in a longitudinal direction. Furthermore, the link is selectively connectable to the tail 37 at different positions along the length of the slot 38 so as to permit adjustment of the relative setting of the gauge movement and the free end of the Bourdon tube.

The link 39 is slotted at 43 at its end which is connected to tail 37 of gear segment 26 so that the gear segment is rotated counterclockwise, as viewed in Figures 1 and 2, by the Bourdon tube when the tube expands and raises link 39, but is not rotated clockwise by the tube when it contracts and lowers link 39. By this construction, the gear segment can be damped independently of the flow of pressure fluid into the Bourdon tube, thereby maintaining the pressure line into the tube free and unrestricted at all times so that all variations in pressure of the source will be impressed upon the tube. A light hairspring 44 rotates the gear segment clockwise for taking out the backlash in the gear segment, and provides smooth, regular rotation of the pointer spindle 36 for returning the pointer to zero position.

A damping device generally indicated at 45 is applied to the gauge movement 25 to damp pulsating motion of the movement for effecting a steady registration of the mean, peak or average value of the pressure measured. Preferably the device is applied to the gear segment arbor 27 as illustrated, although it may be also advantageously applied to the pointer spindle 36 or even to a shaft geared to the pointer spindle at a stepped-up ratio.

The damping device includes a multi-vaned rotor 46 enclosed and rotatable within a sealed chamber 47 which is filled with a damping substance 48. The rotor is carried on a portion of the arbor 27 which extends rearwardly through the plate 29 and into the sealed chamber 47. The chamber is formed within a cap 49 secured to plate 29 by cap screws 50. Ample clearance is provided between the outer margins of the rotor vanes and the inner wall of the chamber to allow free flow of the substance within the chamber.

The vanes of the rotor have a curved face 51 on one side thereof and a flat rectilinear surface 52 on the opposing side so that when they act in the damping substance described hereinafter, they will resist rotation more in one direction than in the other. Accordingly, as the rotor is turned clockwise (Fig. 4) by the increase in pressure in the Bourdon tube 22, the vanes offer less resistance to movement than they do when they are turned counterclockwise by the hairspring 44.

In accordance with the present invention, the damping material used in chamber 47 may be defined as a "dilatant substance," i. e. one which sets solid under shearing stresses that are applied rapidly, but which flows readily under steady shearing stresses. The substance used is preferably a dimethyl silicone composition, such as described in U. S. Patent No. 2,541,851 and commercially known as a "bouncing putty." It can be theorized that this composition which has both elastic and plastic properties may be a two phase system with hydrophilic methyl group attached to silicon and a viscous liquid reaction product of the boron compound and some of the methyl silicone, the latter hydrophilic reaction product being a continuous phase between and in the interstices of the cross-linked silicone. When subjected to gradually applied pressure, the internal friction can be overcome so that the boron product is able to flow. Yet when subjected to more suddenly applied force, flow will be resisted. The composition thus will act effectively as a damping agent.

In operation, this substance will flow readily under light, steady forces, thereby permitting the rotor 46 to be turned in one direction by the hairspring and in the other direction by the Bourdon tube. However, when the shearing stress is applied more rapidly by the rotor 46, the substance will assume the rigidity and elasticity of a solid and will thereby resist sudden impulses transmitted to the gauge movement by the Bourdon tube. In this way the pulsations of the pressure source being measured are effectively damped. Even the surface forces of this substance are very small and will not materially resist the light forces available in the gauge movement. Finally, these properties remain substantially the same over a wide range of temperatures.

Other examples of dilatant substances which may be used are: certain asphalts, resins and gums exhibiting the aforementioned dilatant substance characteristics.

By using dilatant substances and by applying a damped rotor to a moving element of the gauge movement, the gauge can be damped effectively irrespective of the rates and amplitudes of the pulsations to which the source being measured is subjected. In addition, by applying the damped rotor to the segment arbor 27, there is very little wear on the gauge movement because the damping forces are applied ahead of the gear segment and the indicator pinion, and there is very little friction because rotary displacement of the arbor 27 is very small. In fact, the rotary displacement of the arbor is much less than that of the gear segment or the pointer spindle so that the friction is correspondingly lower than it would be if the damping rotor was applied to either of these elements.

This damping device is particularly advantageous because once it is properly assembled, there will be for all practical purposes substantially no leakage because of the extremely viscous nature of the substances used. Furthermore, the nature of the damping device permits of adaptation to conventional gauges, and the size of the damping chamber is small enough so that it will not increase the size of any gauge to which it is applied. Still another advantage is that the presence of this damping device does not render the interior of the gauge less accessible for adjustment and maintenance of the gauge movement or of other parts of the gauge. It should be also noted that the damping means can be applied to other condition responsive means.

It will be understood that the foregoing detailed description and the accompanying drawings are illustrative and that the improvements herein disclosed may be embodied in various forms of construction within the scope of the appended claims.

What is claimed is:

1. In a gauge, a Bourdon tube, an indicating element, actuating means in driving relation to said indicating element for imparting to said indicating element deflections corresponding to the motion of the Bourdon tube, connecting means between the free end of said Bourdon tube and said actuating means for transmitting motion of said free end in one direction to said actuating means, resilient means urging said actuating means in a direction opposite to the direction of said motion but yieldingly allowing such motion, said connecting means including a link pivotally connected at one end to the free end of said Bourdon tube and at its other end to said actuating means, the connection of said link with one of said pivotal connections including a longitudinally extending slot allowing limited movement of the free end of the tube relative to the actuating means, and means operative to damp the motion of said actuating means and including a confined body of a silicone material which is yieldable under light steady stresses but substantially solid-like when subjected to suddenly applied stresses, and a damping member connected with said actuating means and immersed and movable in said silicone material allowing slow and steady motion of said actuating means and damping sudden forces applied to said actuating means.

2. In a gauge, a Bourdon tube, an indicating element, a gauge movement in driving relation to said indicating element for imparting to said indicating element deflections corresponding to the motion of the Bourdon tube, said movement including a segment pivotally mounted for swinging movement about a substantially fixed axis, means connecting the free end of said Bourdon tube and said segment for transmitting motion of said free end in one direction to said segment, a spring urging said segment in a direction opposite to the direction of said motion but yieldingly allowing such motion, said connecting means including a link pivotally connected at one end to the free end of said Bourdon tube and at its other end to said segment, the connection of said link with one of the pivotal connections including a longitudinally extending slot allowing limited movement of the free end of the tube relative to the segment, and means operative to damp the motion of said segment and including a confined body of a silicone material yieldable under light steady stresses but substantially solid-like when subjected to suddenly applied stresses and a rotor connected with said segment for rotating movement therewith about the pivotal axis of said segment, said rotor having radially extending vanes movable in said silicone material, the vanes having opposing faces having different resistance characteristics so as to resist rotation more in one direction than in the other.

3. In an indicating instrument, condition responsive means, an angularly movable indicating element, an angularly movable member in driving relation to said indicating element and responsive to movement of the condition responsive means to impart motion corresponding to such movement to said indicating element in advance and receding directions, a pair of shafts respectively carrying said indicating element and said angularly movable member, a confined body of a dilatant substance which is yieldable under light steady stresses but substantially solid-like when subjected to suddenly applied stresses, a damping rotor immersed in said body of damping substance and connected with said shaft carrying the angularly moving member for rotation therewith, said rotor having radially extending vane means, each vane means having opposing faces having different resistance characteristics as the rotor is turned resisting rotation in said damping substance more in the receding direction than in the advance direction.

4. In an indicating instrument, condition responsive means, an angularly movable indicating element, an angularly movable member in driving relation to said indicating element and responsive to movement of the condition responsive means to impart motion corresponding to such movement to said indicating element, a pair of shafts respectively carrying said indicating element and said angularly movable member, a confined body of a viscous damping material yieldable under light steady stresses but substantially solid-like when subjected to suddenly applied stresses, and a damping rotor immersed in said body of damping material and connected with said shaft carrying the angularly moving member for rotation therewith, said rotor having radially extending vanes with opposing working faces having different resistance characteristics as the rotor is turned so as to resist rotation in said damping substance more in one direction than in the other.

5. In an indicating instrument, condition responsive means, an angularly movable indicating element, an angularly movable member in driving relation to said indicating element and responsive to movement of the condition responsive means to impart motion corresponding to such movement to said indicating element, a pair of shafts respectively carrying said indicating element and said angularly movable member, a confined body of silicone putty, and a damping rotor immersed in said body of silicone putty and connected with said shaft carrying the angularly moving member for rotation therewith, said rotor having radially extending vanes with opposite working faces on either side of each, said face having different resistance characteristics as the rotor is turned so as to resist rotation in said damping substance more in the receding direction than in the advance direction.

6. In condition responsive means, a frame, an indicator element, condition responsive means, a gear segment having an arbor pivotally mounting such segment in said frame, means operatively connecting said gear segment with said condition responsive means for transmitting motion of said condition responsive means to said gear segment, a shaft mounted in spaced parallel relation to said arbor, said shaft rotatably carrying said indicator element and having fixed thereon a pinion to mesh with said segment for imparting to said indicator element motion corresponding to the motion of said condition responsive means, a damping rotor concentrically fixed to said arbor, a casing enclosing said rotor, and silicone putty filling said casing which is yieldable under light steady stresses but substantially solid-like when subjected to suddenly applied stresses, said rotor having vanes movable in said putty allowing slow and steady movement of the arbor and gear segment and damping sudden forces applied to the arbor and gear segment.

References Cited in the file of this patent

UNITED STATES PATENTS

| 786,696 | Vreeland | Apr. 4, 1905 |
| 1,565,447 | Heise | Dec. 15, 1925 |
| 1,939,466 | Ruopp | Dec. 12, 1933 |
| 2,125,016 | Gruver | July 26, 1938 |
| 2,223,579 | Ruopp | Dec. 3, 1940 |
| 2,631,690 | Dunham | Mar. 17, 1953 |

FOREIGN PATENTS

| 681,521 | France | Feb. 3, 1930 |
| 824,564 | Germany | Dec. 13, 1951 |

OTHER REFERENCES

Publications: Reiner (text): Deformation and Flow, pp. 317–321, H. K. Lewis & Co., Ltd. London, 1949.

Product Engineering, pp. 90–93, January 1950.